Patented May 13, 1952

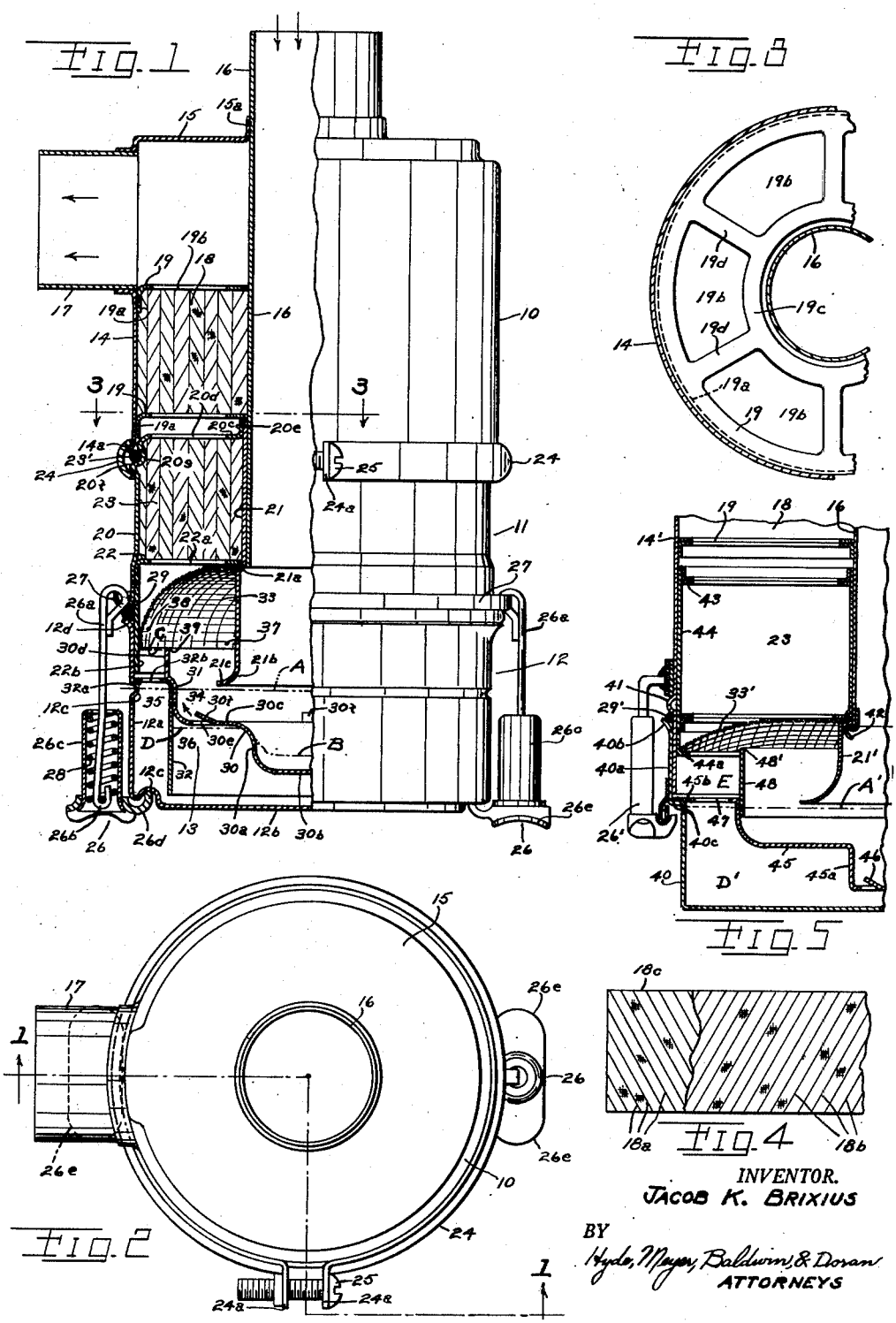

2,596,121

UNITED STATES PATENT OFFICE 2,596,121

STACK-TYPE OIL BATH FILTER

Jacob K. Brixius, Cleveland, Ohio, assignor to Air-Maze Corporation, Cleveland, Ohio, a corporation of Delaware Application July 28, 1949, Serial No. 107,255

8 Claims. (Cl. 183—15)

This invention relates to improvements in a stack-type oil bath filter.

One of the objects of the present invention is to provide an improved type of filter wherein the entering stream of dirty gas or air passes downwardly through a central tube, then impinges against an oil bath in a cup, then flows radially outwardly in all directions and upwardly through a mass of wires or similar material which serves the double purpose of catching the dirt on oil washed surfaces and also preventing the carrying of oil droplets out the exit.

Another object of the present invention is the control of the oil as it is added to the air stream at several points along its path of travel so that the gaseous stream to be cleaned is thoroughly saturated with the oil but not to a degree where oil is carried past the outlet.

Still another object of the invention is the provision of a manometer type of control for the oil in the bowl at the base of the filter so that the desired amount of oil goes into action in the filter itself and other oil is stored in the most desirable manner and fed to the flowing stream continuously in regulated small amounts.

Another object of the present invention is the provision of zones which are relatively quiet and permitting the oil washing down from the filter to return to the bath in the lower portion of the filter housing.

Another feature of my invention is the arrangement of the entire device in suitable sub-assemblies which are thereafter assembled together in a novel manner so as to provide an efficient device and one which is easily cleaned, but which is fool-proof in the hands of the usual operator.

Other objects and advantages of the present invention will be apparent from the accompanying drawings and description and the essential features will be summarized in the appended claims.

In the drawings, Fig. 1 is a view of one embodiment of my device taken along the line 1—1 of Fig. 2 and wherein the left-hand portion of Fig. 1 is a central sectional view and the right-hand portion is a side elevational view;

Fig. 2 is a top plan view of the device of Fig. 1;

Fig. 3 is a fragmental sectional view taken along the line 3—3 of Fig. 1;

Fig. 4 is a view illustrating one type of screen element which is suitable for use in my improved filter; while Fig. 5 is a fragmental sectional view similar to a portion of Fig. 1 and showing a modified construction.

Referring now to Fig. 1, I have shown one form of my device as embodying a top sub-assembly 10, an intermediate sub-assembly 11, a bowl sub-assembly 12 and a baffle sub-assembly 13. The top sub-assembly comprises an outer cylindrical housing forming an upper housing part 14, open at the bottom and closed at the top by the annular plate 15. A central tube 16 extends downwardly through the annular plate and provides the inlet for the dirty gaseous stream to be cleaned. Preferably, the annular plate 15 has an upturned flange 15a which is secured as by welding to the tube 16. Near the top of the housing 14 and at one side there is provided an outlet nozzle 17 which communicates with the interior of the housing 14. Just below the level of the outlet 17 is provided a layer 18 of filter material. This layer is preferably of a foraminous material providing a great many wires producing a maze through which the mixed stream of gas, dirt and oil particles must work its way upwardly toward the outlet 17. One form of material which is suitable for filling the layer 18, is a foraminous screen mesh material such as disclosed in United States Patent No. 2,190,683 granted to Albert E. Schaaf et al. February 20, 1940. Such a screen layer is illustrated in Fig. 4 having the same depth as the layer 18 which may be formed from concentric strips constructed as shown or may be rolled upon itself spirally until the layer 18 is complete to the annular depth required. As shown in Fig. 4, one layer of the screen material has corrugations 18a extending at an angle to the vertical while the adjacent layer has corrugations 18b which extend at an angle to the corrugations 18a so as to prevent nesting of adjacent layers. As taught in the above mentioned Schaaf et al. patent, a single strip of screen material may be folded along its upper edge 18c so as to provide this construction if desired. Another manner of providing a foraminous screen mesh material which is suitable for the layer 18 is shown in the copending application of Oliver H. Schaaf, Serial No. 760,320, filed July 11, 1947, now Patent 2,567,030 dated September 4, 1951, where the crimps do not extend in straight lines as indicated in Fig. 4 but instead are of Z-form. Above and below the filtering layer 18 are provided holding means for the same. These are alike and are shown in Fig. 3. An annular plate 19 has its outer rim 19a turned downwardly to provide a flange which is welded to the wall of the housing 14. A major portion of the plate is cut out as shown at 19b to provide openings for the flow of gaseous stream. This leaves an internal ring 19c which has a slight clearance from the central tube 16. A plurality of webs 19d extend between the internal ring 19c and the outer rim so as to provide the necessary strength. The lower rim of the housing 14 is flared outwardly as shown at 14a so as to aid in securing the housing 14 to the member below it.

The intermediate assembly 11 comprises an outer, generally cylindrical wall forming a lower housing part 20 and an inner tube 21 which fits telescopingly outside of the lower end of tube 16. A plate 22 provided with perforations 22a similar to the perforations shown at 19b has a downwardly extending peripheral flange 22b which is welded at its upper portion to the lower end of the cylindrical member 20. A layer of filter material 23 similar in construction to that shown at 18 rests upon the plate 22a and upon radially extending ribs of the same similar to the ribs 19d of Fig. 3. The upper side of this layer is contained by means of a plate 20c which in the present instance is integral with the member 20 but which might be a separate plate if desired and welded to the member 20. This is provided with openings 20d similar to the openings 22a to permit the free flow of gaseous stream upwardly. A flange 20e is turned upwardly at the inner edge of the plate 20c and is welded to the tube 21 at its upper end. The material of the cylindrical wall member 20 is bent outwardly at 20f to provide an outwardly extending rib and is then bent inwardly to provide a trough at 20g for the purpose of retaining a circular O-ring 23' which extends entirely around the cylindrical member 20 resting in the trough 20g. A clamping ring 24 then extends entirely around the members 10 and 11 at their junction. This ring 24 has a concave inner face which rests upon the flange 14a of the member 14 and also beneath the rib 20f of the member 20. A screw 25 pulls two ears 24a of the band 24 together so as to clamp the ring 24 tightly in place in a well known manner.

The bowl member 12 is of cup-shape opening upwardly and is provided with generally cylindrical side walls 12a and a bottom 12b. The side walls 12a are preferably marked at a level above the bottom at the desirable level for filling with oil. The mark in the present instance is provided with the inturned bead 12c. The bowl member is secured to the intermediate assembly 11 by a pair of clamps 26 arranged diametrically opposite each other. Each clamp comprises a stiff wire 26a looped through a suitable opening in a trough 27 which is integral with the side wall 20 of the intermediate member 11. In the lower end of the wire is provided a hook-shape portion 26b which engages a helical compression spring 28 which is housed inside of a downwardly opening cup-shape thimble 26c. The lower end of the thimble is provided with a nose or projection 26d which engages in a recess 112c in the bottom of the bowl. The thimble 26c is provided with finger grips 26e by which the clamp may be manipulated. The upper edge of the bowl is flared outwardly as indicated at 12d and an O-ring 29 rests in the space between the wall 22b, the trough 27 and the flared flange 12d as clearly shown at the left-hand side of Fig. 1. The clamps 26 are then pulled downwardly against the tension of springs 28 and the noses 26d are engaged beneath the bottom wall of the bowl so that the bowl is held tightly to the intermediate assembly 11.

Inside of the bowl is the baffle sub-assembly 13. This comprises a generally imperforate double cup member 30 which is secured as by welding at 31 to a skirt member 32. This skirt member is a generally cylindrical baffle extending to a point near the bottom 12b and having a radially outwardly extending flange 32a at its upper end adapted to rest upon the bead 12c of the bowl. This is the sole support for the cup 30 and the skirt 32 and holds all of the parts at the proper level and centered within the bowl structure. A plurality of openings 32b through the flange 32a permit a free flow of oil at this point.

The double cup member 30 comprises two concentric and connected cup portions. A smaller cup portion has generally cylindrical side walls 30a of a diameter slightly less than the diameter of tube 21 and an imperforate bottom 30b. A larger cup portion has a radially extending bottom 30c which extends outwardly from the top of the cylindrical wall 30a being connected therewith by a smooth curve. This bottom wall extends outwardly to the skirt 32 and to the securing point 31 previously mentioned. The wall of the larger cup portion then extends upwardly terminating in a generally cylindrical portion 30d which extends to a vertical cylindrical rim at a point somewhat above the bottom of the tube 21 and above the flange 32a. A plurality of relatively small openings 30e are arranged in a circle around the bottom 30c. Preferably, these openings are provided by punching tongues 30f upwardly acting as baffles and extending radially outwardly from the attached end of the tongue. It will be noted in Fig. 1 that these openings 30e are just radially outside of the lower end of tube 21 projected in a vertical plane. The double cup member 30 is entirely imperforate except for the openings 30e.

Beneath the filter element 23 and above the cup lip 30d, I provide means for returning down flowing oil from the filter element to the bath in the bowl. In the present instance, this means comprises a foraminous screen mesh member 33 which is preferably of a coarse hardware cloth of the order of three or four meshes per inch. The member 33 is formed in a generaly dome-shape having its upper inner edge resting on a slight shoulder 21a formed where the tube 21 flares slightly outwardly near the end of tube 16. The lower outer end of the foraminous member 33 touches the cylindrical wall 22b and rests upon the lip 30d of the double cup member 30.

The operation of my invention should now be apparent. The bowl 12 is first filled with oil to the liquid level indicated at A, Fig. 1, as indicated by the bead 12c. Throughout the specification and claims, I have used the term "oil" to mean any suitable liquid adhesive which may be carried by the air stream up into the filter elements 18 and 23 to catch the dirt particles in the gaseous stream and to wash the same back into the bottom of the bowl. The filter is usually mounted in a position where a gaseous stream will be drawn into the inlet tube 16 and discharged at the outlet tube 17. A common use of this filter is in connection with an internal combustion engine where the suction at the discharge end 17 is caused by the reciprocating cylinders of the engine which induce a suction which causes the flow through the filtering device. The description will proceed with the assumption that this is one use of the same. The dirty air then flows downwardly through the tube 16 which is telescoped into the tube 21 as shown so that the flow continues to the bottom of the tube 21 where it then turns radially outwardly in all directions moving freely and smoothly over the curved surface 21b which terminates in an out-turned flange 21c. Any heavy dirt particles coming down the central tube will strike the oil in the smaller cup portion 30a, 30b so that a great deal of this material will be retained there. The depth of the cup is so proportioned that the oil will not be entirely blown out of the smaller cup portion 30a, 30b by the flow of air at the rated velocity. The oil level will therefore drop to the dot-dash line B indicated in the small cup. At the same time, the differential pressure above and below the annular opening 34 will cause the oil level in the outer annular chamber 35 to be raised to the level of the dot-dash line C of Fig. 1, and the level in the chamber 36 inside of the skirt 32 will drop to the level of line D there indicated. In other words, the chambers 35 and 36 are a manometer with the two legs separated by the skirt 32. The level D is just slightly below the bottom wall portion 30c and the air streaming at high velocity radially outwardly over the tongues 30f induces a slight flow of oil through the openings 30e in the direction of the small arrow of Fig. 1. Some of the oil displaced from the bowl 12 is carried upwardly by the air stream and thoroughly coats the foraminous wire screen mesh material in the filter elements 18 and 23. However, these elements are so arranged and contain such a maze of wires that no oil droplets are carried to the outlet 17. Dirt particles not caught in the striking of the oil in the smaller cup at the base of tube 21, are carried upwardly, mingled with oil and trapped in the filter elements 18 and 23 and washed back downwardly by the continuous flow of oil which goes on. Due to the arrangement of the flange or lip 21c there is a quiescent zone at 37 just above this lip and adjacent the outer wall of tube 21. There is another quiescent zone at 38 just above the annular chamber 35. This permits oil returning downwardly from the filter elements to drain down alongside the tube 21 and to drip off the flange or lip 21c into the upcoming stream. Other oil comes down the outer wall of the cylindrical wall 20 and down along the member 22 to return to the chamber 35. Some of this oil will drip over into the upcoming air stream at the zone 39. The wires of the screen 33 permit other oil dropping down intermediate the tube 21 and the wall 22b to be carried radially outwardly and downwardly along the wires 31 to be returned to the chamber 35.

In a modified form of my construction, illustrated in Fig. 5, the device is made in two parts instead of three as in the case of the device of Fig. 1. In the device of Fig. 5, the parts 15, 16, 17, 18 and 19 are the same as in the first described form. The cylindrical wall portion 14′ extends entirely down the length of the filter material sections 18 and 23 to terminate just above the flange 40c. The lower bowl or oil reservoir 40 has a cylindrical wall 40a which fits telescopingly outside the lower portion of member 14. Here a rubber ring 29′ is held between the bead 41 on member 14 and the lip 40b of the lower bowl 40. The lower end of the central tube 21′ is telescopingly connected to the lower end of tube 16 as in the first described form. In addition, clips 42 hold these parts assembled. If desired, this end portion 21′ could be made integral with tube 16. The perforated wall portion 43 extends across the top of the filter element 23 and is welded to cylindrical wall 44 which extends downwardly along the inside of wall 14′ of the housing, terminating a little below the rim 48′ in an inturned flange 44a. The sheet of coarse screen material 33′ is in all respects analogous to the member 33 of the first described form. Its outer edge rests on flange 44a. The receptacle 45 is a double cup member like 30 having a smaller cup portion 45a which always retains some oil. Several openings 46 permit return of oil from the chamber D′ to the reservoir of oil inside of 45a. The receptacle 45 has an out-turned edge flange 45b which rests on the shoulder 40c. Several openings 47 permit flow of oil from the annular space E downwardly. A cylindrical partition 48 extends upwardly from the larger cup portion of receptacle 45 as an extension of the cup and terminates in a vertical cylindrical rim 48′. In this form of my device, when the clamps 26′ are released, the lower portion comes away for cleaning and servicing bringing the lower tube portion 21′ with it so that it is easily cleaned. The parts 40a and 14′ come apart at the seal 29′. In other respects the device of Fig. 5 functions like the device of Fig. 1.

It will be noted in Fig. 5 that a partition has been omitted in the position of the partition 32 of Fig. 1. This partition in Fig. 1 forms a manometer-like arrangement so that the oil inside of the partition is subjected to the higher pressure of the inlet air stream and the oil outside of the partition is subject to air under lesser pressure at the zone 39. Thus, the column of oil outside of the partition 32 up to the top of the rim 31 at the zone 39 forms a seal preventing the leakage of air downwardly through openings 30e and through the oil bath and upwardly outside of the rim 31. In Fig. 5 this partition similar to 32 has been omitted. Instead the rim 38 has been extended upwardly to the zone 49′ sufficiently to maintain a column of oil outside of the partition 48 which is of great enough depth to prevent the leakage or bypassing of oil downwardly through the openings in reservoir 45a below the baffle 46 and thence outwardly through the oil bath and upwardly outside of the rim of the larger cup portion of the double cup member 45 and outside of the rim 48.

It is important to the functioning of my filter that the parts be properly proportioned. The cross-sectional area of the central inlet tube 16 with relationship to the cubic feet per minute of dirty air entering the device is critical. I find that the cross-sectional area of the central tube 16 should measure in square inches between one-twenty-fifth and one-fortieth of the rated capacity of the filter for air volume rated in cubic feet per minute. I find that the best results occur when the cross-sectional area of the inlet tube in square inches is one-thirtieth of the air volume handled in cubic feet per minute.

I find another critical relationship in the volume of oil between the level A and the bottom 30c and the bottom of the smaller cup portion 30b. This volume which I shall hereafter call the central volume has a critical relationship with what I will hereafter call the peripheral volume. This is the volume in the annular space between the lines A and C and between the walls 30d and 22b of Fig. 1 and the similar walls of Fig. 5. I find that the central volume should be between one and one-half and two times the peripheral volume and the best results are obtained when the central volume is one and three-quarters times the peripheral volume. It results from this proportioning of the parts that when the device is in action, some of the oil beneath the level A in the central volume is forced outwardly up to the level of the line C to fill the peripheral volume and the excess oil capacity goes up to wet the filter elements 18 and 23 together with the moving oil in action.

It should be understood that throughout the entire discussion of this subject, there is always a pool or reservoir of oil above the bottom 30b of the smaller cup portion up to approximately the level indicated by the dot-dash line B of Fig. 1. I find that by proportioning the area of the central inlet tube to the air capacity as described above and by regulating the amount of oil in the device in the central volume as compared to the peripheral volume, I can maintain this pool or reservoir of oil in the central cup at the rated capacity of the unit.

The rules as to the proportioning of the various parts, as set forth in connection with the embodiment of Fig. 1, should also be applied to the form shown in Fig. 5. The cross sectional area of the central inlet tube 16 should be held in the same relationship to the cubic feet per minute of dirty air entering the device. The central volume of oil between the normal oil level line A' of Fig. 5 and the two bottoms of the larger and smaller cup portions of the receptacle 45 should be between one and one-half and two times the peripheral volume as represented by the annular space E between the line A' and the level of the rim 48'. If these rules are followed, there will always be a pool of oil in the lower reservoir 45a of the receptacle 45 when the device is in action.

When the filter of Fig. 5 is being utilized at its rated capacity, the oil in the central volume is reduced below the normal level A' down to a low point in the reservoir 45a and this oil goes to fill the peripheral volume E and also fills up the filtering elements 18 and 23 and becomes part of the oil in action also.

What I claim is:

1. In a liquid washed filter, the combination of a generally cylindrical housing positioned with its axis vertical, top and bottom walls substantially closing said housing, an inlet for a dirty gaseous stream comprising a tube positioned axially of said housing, said tube leading into the top of said housing and terminating at its mouth above the bottom wall of said housing, there being an outlet from said housing near the top thereof, a double cup member in said housing and spaced below the mouth of said tube, said cup member having larger and smaller concentric connected cup portions with the smaller cup portion depressed below the larger cup portion, the bottom of said larger cup portion extending radially outwardly from the upper edge of said smaller cup portion and then turning upwardly to provide a vertical rim, a flange extending outwardly from the mouth of said tube, said bottom of said larger cup portion being lower than the mouth of said tube and said rim being spaced radially outwardly from the flange of said tube, said rim ending at a level above the mouth of said tube, there being spaced openings extending through the bottom of one of said cup portions, baffles above said openings inclined outwardly and upwardly, an imperforate cylindrical partition wall forming a skirt generally concentric inside said housing and extending from said rim to a point near the bottom wall of said housing, two portions of foraminous filter material spanning the annular space between said tube and said housing above the mouth of said tube and below said outlet, there being an open space between said tube and said housing between said filter portions, and normal oil level indicia at a level just below the mouth of said tube.

2. The combination of claim 1 wherein the central volume of oil between said normal oil level and the bottoms of said larger and smaller cup portions is between one and one-half and two times the peripheral oil volume measured in the annular space between said skirt and said housing and between said normal oil level and the level of the top of said rim.

3. In a liquid washed filter, the combination of a generally cylindrical housing positioned with its axis vertical, top and bottom walls substantially closing said housing, an inlet for a dirty gaseous stream comprising a tube positioned axially of said housing, said tube leading into the top of said housing and terminating at its mouth above the bottom wall of said housing, there being an outlet from said housing near the top thereof and independent of said inlet tube, a double cup member in said housing concentric below the mouth of said tube, said cup member having larger and smaller concentric connected cup portions with the smaller cup portion depressed below the larger cup portion, said smaller cup portion forming a reservoir, the bottom of said larger cup portion extending radially outwardly from the rim of said smaller cup portion, the upper rim of said larger cup portion being spaced inwardly from said housing, said bottom of said larger cup portion being lower than the mouth of said tube and said rim being spaced radially outwardly from the mouth of said tube, there being spaced openings extending through the bottom wall of one of said cup portions, foraminous filter material spanning the annular space between said tube and said housing above the mouth of said tube and below said outlet, and normal oil level indicia at a level just below the mouth of said tube.

4. The combination of claim 3 including a sheet of coarse foraminous material below said filter material and extending from said tube, close to said filter material, outwardly and downwardly to the side wall of said housing at approximately the level of said rim.

5. The combination of claim 3 wherein said spaced openings extending through the bottom wall of one of said cup portions are provided in the bottom wall of said smaller cup portion, and baffles above said openings inclined outwardly and upwardly.

6. The combination of claim 3 wherein said spaced openings extending through the bottom wall of one of said cup portions are provided in the bottom wall of said larger cup portion, and baffles above said openings inclined outwardly and upwardly.

7. The combination of claim 3 wherein said housing has an upper part and a lower part, said filter material has an upper portion carried by said upper housing part and a lower portion carried by said lower housing part, said tubing has a lower portion carried by said lower housing part, and a separable fluid tight connection between said lower and upper housing parts, whereby said lower housing part may be removed, carrying with it said lower tube portion.

8. The combination of claim 3 wherein the cross-sectional area of said central inlet tube measured in square inches is between 1/25th and 1/40th of the rated air capacity of said filter measured in cubic feet per minute.

JACOB K. BRIXIUS.

REFERENCES CITED

The following references are of record in the file of this patent:

UNITED STATES PATENTS

| Number | Name | Date |
|---|---|---|
| 2,062,548 | Wilson | Dec. 1, 1936 |
| 2,171,752 | Kamrath | Sept. 5, 1939 |
| 2,342,447 | Bennett et al. | Feb. 22, 1944 |
| 2,387,278 | Lowther | Oct. 23, 1945 |